T. W. PORTER.
Carriage-Steps and Foot-Rails.

No. 146,551. Patented Jan. 20, 1874.

Witnesses:
Herbert T Whitman
H. K. Porter

Inventor:
Thomas W Porter

UNITED STATES PATENT OFFICE.

THOMAS W. PORTER, OF BOSTON, MASSACHUSETTS.

IMPROVEMENT IN CARRIAGE-STEPS AND FOOT-RAILS.

Specification forming part of Letters Patent No. 146,551, dated January 20, 1874; application filed September 17, 1870.

*To all whom it may concern:*

Be it known that I, T. W. PORTER, of Boston, in the county of Suffolk and State of Massachusetts, have invented new and useful Improvements in Carriage-Irons, of which the following is a specification:

This invention relates to the peculiar form, material, combination, or arrangement of parts of the several irons; and the invention consists of a foot-rail, the sections of which are united in a peculiar manner, and having roughened foot-pieces, of hard metal, inserted in the rail at the proper points; also, in a step-pad having projections formed upon the under side, by which to secure it to the shank, and also to secure the rough pieces of hard iron which are inserted in the pad.

Figure 1:
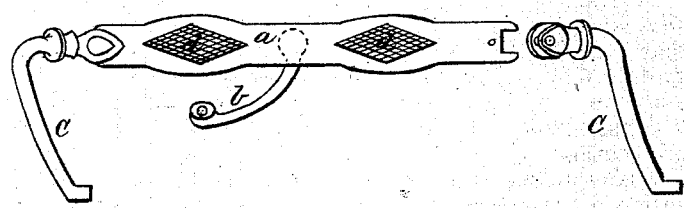
Figure 2:
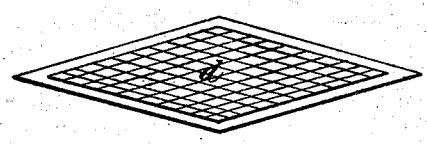
Figure 3:
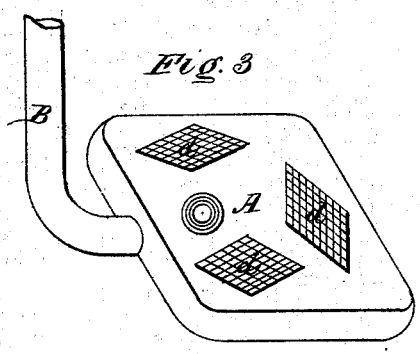
Figure 4:
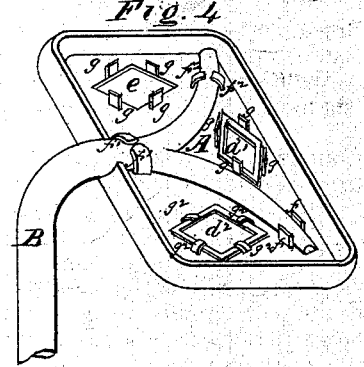

In the drawings, Figure 1 is a perspective view of the foot-rail, one end bracket being detached to show the manner of connection with the rail. Fig. 2 is a top or plan view of one of the hard-metal pieces which are inserted in the steps and foot-rails. Fig. 3 is a perspective view of the step-pad and a portion of the shank. Fig. 4 is an under-side view of Fig. 3.

In the drawings, a represents the central portion of the foot-rail. b is a front, and c c are the end brackets, the right-hand one being represented as detached from the central part a, in order to show the construction of the parts and hole through which the rivet passes that connects the parts together. d d are two diamond-shaped pieces of white iron, which are inserted in corresponding holes in rod a, and are secured therein by projections formed upon the back side of rod a in the same manner as is shown upon the step in Fig. 4.

Fig. 2, as before stated, represents one of the diamond-shaped pieces which are inserted in the rail and steps, and which have formed upon their faces small sharp projections for the purpose of insuring a firm foothold when resting thereon in entering or leaving the vehicle. These pieces may be of any desired form of outline, and they have a slight lateral projecting rim at the edge near the lower side, to prevent their passing too far through when being fastened in place.

A, Figs. 3 and 4, represents a step-pad or foot-piece, and B is the shank. The pad is formed with holes, as shown at e, Fig. 4, in which are inserted the rough pieces d, as before stated.

In Fig. 4 are shown projections formed upon the pad and marked f, they being so arranged as to secure the pad to the shank by clinching them around the same, as shown at $f^1$ and $f^2$, Fig. 4, while those marked g are formed around holes e, and serve to secure the pieces d in the same manner as is shown at $g^2$ in said figure. In this figure the projections around piece $d^1$ are shown upright, as formed, while those around $d^2$ are shown clinched down upon the inserted piece to hold it in place.

Having thus described my invention, what I claim as new, and desire to secure by Letters Patent, is—

1. A foot-rail having the brackets c c united with the bar a, substantially as described and shown.
2. The roughened metallic pieces d d, in combination with rail a, substantially as described and shown.
3. The roughened metallic pieces d, either hardened or unhardened, in combination with step A, substantially as described and shown.
4. The projections f, formed upon pad A, substantially as and for the purposes specified.
5. The projections g, formed upon step A around openings e, substantially as and for the purposes specified.

THOMAS W. PORTER.

Witnesses:
  EBEN HUTCHINSON,
  EUGENE HUMPHREY.